United States Patent [19]

Moore et al.

[11] 4,179,704

[45] Dec. 18, 1979

[54] TELEVISION SYSTEM FOR DISPLAYING AND RECORDING PATHS OF MOTION

[75] Inventors: J. Kenneth Moore, Stamford; Arthur Kaiser, Trumbull; Henry W. Mahler, Newtown, all of Conn.

[73] Assignee: CBS Inc., New York, N.Y.

[21] Appl. No.: 864,405

[22] Filed: Dec. 27, 1977

[51] Int. Cl.² .................. H04N 5/22; H04N 9/32; H04N 7/18; H04N 5/24
[52] U.S. Cl. .................................. 358/22; 358/13; 358/105; 358/185
[58] Field of Search ............... 358/13, 22, 105, 142, 358/133, 136, 36, 185; 273/DIG. 28

[56] References Cited

U.S. PATENT DOCUMENTS

| 4,005,261 | 1/1977 | Sato et al. | 273/DIG. 28 X |
| 4,025,718 | 5/1977 | Paretti | 358/105 X |
| 4,026,555 | 5/1977 | Kirschner et al. | 273/DIG. 28 X |
| 4,064,530 | 12/1977 | Kaiser et al. | 358/36 |
| 4,090,221 | 5/1978 | Connor | 358/105 |

OTHER PUBLICATIONS

Moore, Kaiser and Mahler, SMPTE Journal, vol. 87, No. 10, Oct. 1978: A Recent Innovation in Digital Special Effects The CBS "Action Track" TM System.

Primary Examiner—Robert L. Richardson
Assistant Examiner—Aristotelis M. Psitos
Attorney, Agent, or Firm—Spencer E. Olson

[57] ABSTRACT

Television apparatus for producing signals for displaying simultaneously a succession of separated images of an object moving over a selectable time period in an otherwise substantially static scene so that the trajectory of the object can be viewed. The effect is achieved by storing, at the start of the selectable time period, a television frame in a suitable storage device and periodically comparing the stored frame with television frames arriving subsequently during the selectable time period, and upon detection of differences between corresponding picture elements of the stored and subsequently arriving frames, substituting the picture elements that caused the detected difference in the stored frame. The system identifies such substituted picture elements and ensures that the same picture elements are not again substituted during the selectable time period. At the end of the period a video signal representing at least the picture elements substituted in the stored frame during the selectable time period is coupled to display apparatus.

26 Claims, 5 Drawing Figures

TELEVISION SYSTEM FOR DISPLAYING AND RECORDING PATHS OF MOTION

BACKGROUND OF THE INVENTION

For many years multiple-flash stroboscopic photography has been used to show in a single picture the complete motion path of an object. This technique has been found to be a useful and instructive way of visualizing the subtle changes associated with athletic activities, for example. The apparatus for producing such photographs include a stroboscopic light source for intermittently illuminating the object in motion and a black scene background so as not to overload the photographic system which successive exposures to light. Since this technique requires development of the exposed film, the photographic approach does not provide immediate nor real-time access to the picture information.

Attempts to reproduce similar effects in television have been restricted to non-real time mixing of successive images from a recording system. Although such previous attempts produce results suitable for certain artistically satisfying and useful effects, the apparatus is expensive and the process laborious and time-consuming.

The primary object of the present invention is to provide a television display which portrays the motion of an object in a scene during a specific time interval such that in addition to its present position being shown, a plurality of earlier positions, commencing with the start of the time interval, are also depicted. Another object of the invention is to provide a system as described in the previous sentence having the capability of retaining, after termination of the specific time interval, the signal information representing the plurality of displayed object positions. Another object of the invention is to provide a display as described above in color which places no restrictions on the nature of the picture background other than what would constitute good color television practice, nor on the origination of the source of the input video signal.

BRIEF DESCRIPTION OF THE INVENTION

Briefly, these objects are achieved by a system including a storage device capable of storing one television frame and adapted to accept substitute information concerning individual picture elements of a television signal stored therein in combination with means for comparing a television frame stored in the storage device with selected subsequently arriving frames. Upon detection of differences between corresponding picture elements of the stored and subsequently arriving frames, signifying motion, the picture elements that caused the detected difference are substituted for corresponding picture elements in the stored frame, and the fact of each such substitution is recorded or otherwise indicated. The system is arranged to preclude another substitution of previously substituted picture elements in the stored frame. The frequency of the comparisons, that is, the number of incoming television frames between successive comparisons, is controllable and determines the spacing in the display between successive positions of the moving object.

BRIEF DESCRIPTION OF THE DRAWINGS

Other objects, features and advantages of the invention will become apparent, and its construction and operation better understood, from the following detailed description, taken in conjunction with the accompanying drawings, in which.

DESCRIPTION OF THE PREFERRED EMBODIMENT

Figure 1:
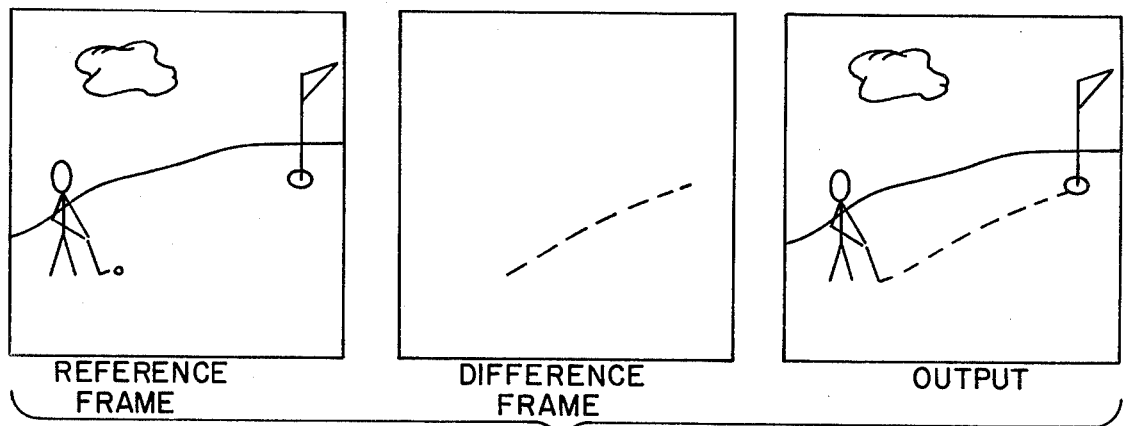
FIG. 1 is a series of three illustrations graphically showing the general function of the invention.

The general function of the present system of storing and displaying the past history of moving objects in a scene so that the path of the moving object can be viewed is schematically illustrated in FIG. 1, using the putting of a golf ball in the direction of the cup as an example. In essence, at the moment in time at which it is desired to start to display and record a motion path, say, at the moment of impact of the putter on the golf ball, the operator initiates the system to store at this moment a single frame of video. This stored frame identified as the "reference frame" in FIG. 1, were it displayed, would show the putting surface, the flag in the cup, the starting position of the ball, and, of course, the golfer stroking the putter into contact with the ball. This stored reference frame is utilized throughout the interval during which motion of the ball is significant to provide a frame of reference against which to determine which elements of the scene have been in motion, in this case, the follow-through of the putter and the motion of the ball toward the cup. In the preferred embodiment of the system, the reference frame is stored in a digital frame store, but it is to be understood that other available means for recording video frames can be employed without departing from the spirit of the invention.

Having established at the "start" time a frozen reference frame, every picture element of the stored frame is periodically compared with every picture element of the video subsequently applied to the system. Due to the motion of the ball in an otherwise static scene, this comparison of the stored reference frame with selected successive frames of new video creates a difference signal, successive ones of which, representative of successive new ball positions, may be stored in a suitable storage device, and if displayed would trace the path of the ball, as schematically illustrated by the diagram labelled "difference store" in FIG. 1. If the camera is held still during the time required for the ball to travel from its initial rest position to a point at which it stops, all background information of the scene will have been static and thus would produce no inputs into the "difference store". In essence, these difference signals are inserted into the stored reference frame to produce a still frame having multiple positions of the ball displayed thereon, which trace its motion path, as depicted in the third illustration of FIG. 1. The difference storage device must have the characteristic that, once a difference picture element is stored, it is not changed again until picture erasure.

Actually, in the preferred implementation of the system, when a difference, signifying motion, is detected between new picture elements and corresponding picture elements in the reference frame, the picture elements involved immediately replace those picture elements which were initially in the frame store at that location. Should a difference be detected in the next comparison, which may follow the previous comparison by one or several frames, the difference signal replaces those picture elements initially in the frame store at the new position of the ball. This process continues throughout the time period during which the path of motion of the ball is to be displayed, the duration of which is controlled by the operator. The altered picture elements in the frame store must not be re-altered during this period. Thus, successive positions of the ball are stored as it goes along its route until it finally drops in the cup or stops elsewhere. The end of the cycle is determined by actuation of a stop button, or alternatively, upon the completion of an automatically determined and preselected time period, wherein the frozen frame, with all of the different positions of the ball, is displayable. This picture information can be stored indefinitely, or it can be erased as soon as the action is over, if desired.

The sequence of picture information can be displayed in a variety of ways. For example, a first mode is to store a reference frame upon actuation of a "start" button and display and stored video and substituted picture elements from the moment of "start" until the action stops, and upon actuation of the "stop" button continue to display the reference frame with all of its substituted picture elements.

In another mode, a reference frame is stored at the moment of "start", and substituted picture elements are inserted therein as they occur during the action period, as before, but live video along with substituted picture elements as they occur are displayed during the action period, at the end of which, upon actuation of the "stop" button, the stored reference frame with all of its substituted picture elements is displayed. In this case, during the time interval between "start" and "stop" the displayed action is mostly live, and one will see the ball moving continuously toward the cup, but will also see behind the moving ball the retained images of its earlier positions. This mode also contemplates the possibility of delaying the display of the substituted picture elements and/or the stored reference video until the end of the selected time interval, or "stop".

A departure from either of the two described modes is to totally suppress all picture elements other than substituted picture elements, in which case the stationary background will be displayed as black. The option to go to stationary black may be exercised in the final freeze frame display, and may be effected by displaying only the contents of the "difference" frame.

Figure 2:
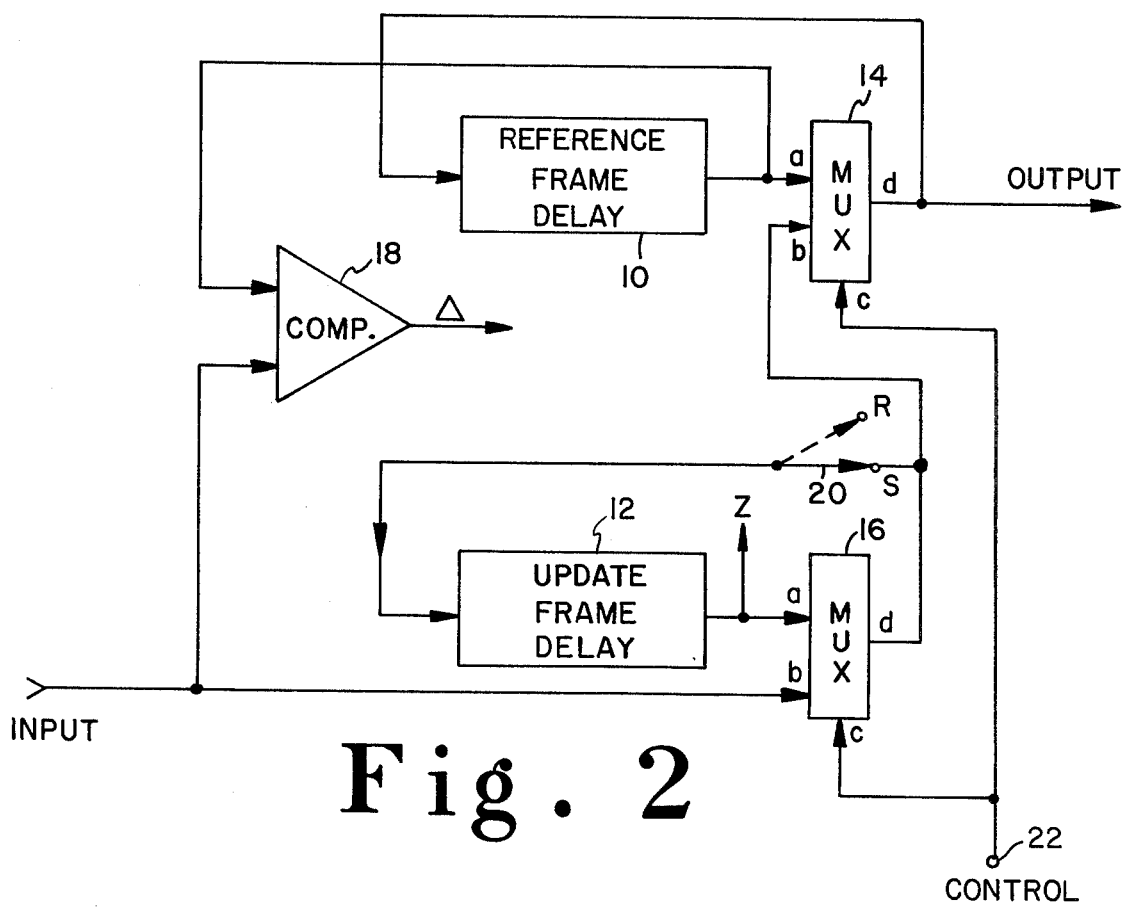
FIG. 2 is a block diagram of the basic system for accomplishing the function of the invention.

The fundamental properties of a system for accomplishing the above-described functions is illustrated in FIG. 2 and includes a reference frame delay 10, an update frame delay 12, a pair of multiplexers 14 and 16 each having two inputs, designated a and b, and a control terminal, designated c, which when enabled is operative to select which of the two inputs is coupled to its output terminal d, a comparator 18, and a switch 20 having an open position R and a closed position S. The incoming video signal, from a color television camera, for example, is applied to one input terminal of comparator 18 and also to the lower input terminal b of multiplexer 16. The output terminal d of multiplexer 16 is connected to the lower input terminal b of multiplexer 14, and when switch 20 is in the closed or S position, is also connected to the input of update frame delay 12, the output of which is connected to the upper input terminal a of multiplexer 16. The output terminal d of multiplexer 14 is connected to the input of reference frame delay 10, the output of which is connected to the upper input terminal a of multiplexer 14, and also to the second input terminal of comparator 18. A control signal at terminal 22 is applied to the control terminal c of both multiplexers and causes them both to select either the signal appearing at input terminal a or at the lower input terminal b. The multiplexers, which may be of any of many types commercially available, either digital or analog, enable the two frame delays to be employed in a circulating mode so as to retain, indefinitely, if desired, whatever information is stored therein.

To achieve the results briefly summarized above, the system functionally illustrated in FIG. 2 has three operational states, namely, a "reset" state in which it has no effect on the incoming video signal, a "start" state, and a "stop" state. In the "reset" state switch 20 is in its open, or R position, and the control signal applied to the control terminal of both multiplexers is such as to select the signal appearing at the lower input terminal b of both multiplexers. It will be seen that in this state the incoming video is coupled through multiplexers 16 and 14 in tandem to the output terminal of multiplexer 14. Since switch 20 is open, the incoming video has no effect on update frame delay 12, and although the signal appearing at the output terminal of multiplexer 14 is applied to the input of reference frame delay 10 it does not affect the output signal since the input terminal a of multiplexer 14 is disabled; that is, multiplexer 14 ignores an input to its a terminal.

When the operator of the system sees the beginning of an action that he wishes to record, he initiates the "start" state, as by pushing a button, which is operative to close switch 20 to its S position and to change the level of the control signal at terminal 22 simultaneously so that both multiplexers 14 and 16 select the signal applied to its upper input terminal a. The precise time at which the control signal is effective to switch to the upper input terminal of the multiplexers is timed with the vertical sync from the incoming video signal to ensure that the actions of the various elements of the system take place at the start and end of a particular television frame. At the instant of "start" the video frame contained in reference frame delay 10 is captured and recirculated through multiplexer 14 and constitutes the "reference frame", pictorially illustrated in FIG. 1, while update frame delay 12 is completely empty. This stored frame is also compared on a picture element-by-picture element basis with the incoming video signal in comparator 18, which produces an output signal, indicated as $\Delta$, whenever there is a finite difference, signifying motion, between the stored video in the reference frame and the incoming video signal. When the value of $\Delta$ is not zero, and the output, designated Z, of update frame delay 12 is zero, the control signal at terminal 22 is altered to select the lower input b to both multiplexers; this has the effect of loading the recirculating reference frame with update information during the brief interval of time during which $\Delta$ is not zero, and when $\Delta$ returns to zero the control again selects the upper input to both multiplexers. This process continues, with comparisons made between the stored video in the reference frame and selected successive frames of incoming video for so long as the operator wishes to record the track of the moving object in the otherwise static background scene, at which time he initiates the "stop" state of the system, as by pushing a "stop" button (not shown). Upon initiation of the "stop" state the control permanently selects the upper input a of both multiplexers, with the consequence that the update frame delay 12 has no effect on the output of multiplexer 14, and the stored reference frame, including the update information inserted therein by the described comparison process, appears at the output of multiplexer 14.

It will have been noted that certain logic is applied to the control line to effect the selection at appropriate times between the upper and lower inputs of the two multiplexers. Although no specific implementation of the required logic is illustrated in FIG. 2, it will now be readily apparent to ones skilled in the art how to set up logic circuits to cause the desired mode of operation.

An alternative to the described operation of inserting update information in the reference frame as it is received and taking the output signal from the reference frame delay 10, is to switch at appropriate times between the reference frame delay 10 and the update frame delay 12 and take the output signal from either of the frame delays. However, if this alternative approach is used, it would be necessary when the "stop" state is initiated to continue to switch back and forth between the reference frame and the update frame for so long as it is decided to hold the picture in the freeze frame condition.

It will have been noted that all that the signal Z at the output of update frame delay 12 does is to provide an indication as to whether the output of frame delay 12 is zero or not zero at any instant in time; when it is zero at the same time that $\Delta$ is not zero the desired logic is applied to the control line. Since the only criterion of the Z signal is whether it is or is not zero it is possible, as will be seen from a later description of a digital implementation of the system functionally illustrated in FIG. 2, by employing 8-bit PCM encoding of the video signal, to use a single bit store of frame duration for the update delay, instead of an 8-bit store of full frame duration. This reduces the storage capacity required from approximately two million bits to approximately one-quarter million bits, and by further system refinements (to be described) it is possible to even further simplify the storage of the update information resulting from periodic comparisons of the video in the reference frame and successive frames of incoming video.

Having described a basic functional system for accomplishing the storage and display of the path of a moving object in an otherwise static background scene, which system can be employed in any of the currently used color television systems, a preferred embodiment of the invention will now be described, with reference to FIG. 3, as applied to NTSC television and implemented in the digital domain. The video input signal on input line 30, from a color television camera, for example, is encoded, as by the pulse code modulation (PCM) technique described in U.S. Pat. NO. 3,946,432, utilizing an 8-bit code, and applied to the lower input terminal b of each of a pair of multiplexers 32 and 34, and also to one input terminal of a comparator 36 labelled "Pixel Compare". The output terminal d of multiplexer 34 is connected to the input of a delay device 38 having a delay of 525H-$\tau$; H represents one television line interval, which means that the delay device introduces a one-frame delay since there are 525 lines per frame in the NTSC system. In a practical system, the delay is actually slightly less than one frame by the period of $\tau$ because of incidental loop delays introduced by other components, such as multiplexer 34, in the recirculating loop. In a system which has been successfully operated, the 525H delay takes the form of a digital frame store having the capability of storing one pulse code modulated video frame. The particular form of the frame store is unimportant, and may be implemented with shift registers, random access memories or any other form of addressable memory, the important consideration being that with digital processing it is possible to achieve essentially unlimited timing accuracy. The output of delay device 38 is applied to a comb filter 40 of known construction synchronized to the local chrominance reference and operative to produce two output signals, one a Y+C signal (which essentially corresponds to the input to the comb filter) and the second Y+C(t), namely, the luminance component plus the chrominance component inverted, with the chrominance inversion occurring as a function of time. More particularly, in one frame the chrominance is inverted, in the next frame it is not, in the next frame it is again inverted, and so on, to ensure that the color subcarrier of the output of frame store 38 will always be in proper phase with the local chrominance reference, because a recirculating frame in NTSC has to have its chroma component inverted on successive frames. The Y+C output signal from comb filter 40 is applied as a second input to comparator 36 and also to the upper input a of multiplexer 34. Thus, the heavy line path from the output terminal of multiplexer 34 through delay device 38, comb filter 40 and back to the upper input of multiplexer 34 is the recirculating loop for the reference frame stored in delay device 38.

A tag module 42 is provided for the purpose of controlling the insertion of update information into the stored reference frame upon detection of motion by comparator 36 between the stored reference frame and selected frames of incoming video. The tag module 42 is not a storage device as was the case in the system functionally illustrated in FIG. 2, but rather, is a logic circuit operative in response to several input signals to provide at appropriate times a control for multiplexer 34 so as to insert update information into the reference frame. This logic circuit has three inputs: (1) the least significant bit of the 8-bit encoded stored frame from delay device 38, (2) a true logic input, $\Delta$ produced when a comparison between the stored frame and a selected incoming frame exceeds an arbitrary threshold level and (3) an input applied over line 44 labelled "Operator Control #1"; line 44 is also connected to the control terminal c of multiplexer 34. It is immaterial whether the true logic is positive or negative so long as the logic of tag module 42 is designed to accommodate it. One output of tag module 42, labelled "Force LSB=1", is connected to the recirculating loop; a signal appearing thereon forces the least significant bit of the 8-bit recirculating encoded signal to equal "1". A second output of tag module 42 applies a "Tag Control" signal to multiplexer 34 whenever $\Delta$ and the least significant bit of the recirculating video signal are simultaneously equal to "0". A second control line 46, designated "Operator Control #2", is connected to the control terminal c of multiplexer 32 and determines whether the operation of the system is to be continuous or sampled, and also serves as the "stop" control. A control line 48 designated "Sampling Rate Enable" is applied to multiplexer 34 and refers to a logic level determined by the selection by the operator of the rate of motion update, the significance of which will become evident as the description proceeds. Finally, the least significant bit of the heavy line recirculating loop is coupled via a line 50 to a second control terminal of multiplexer 32 for causing coupling of the stored reference frame to the system output terminal 52 when multiplexer 32 is properly conditioned by actuation of "Operator Control #2". The logic states of lines 50 and 46 cause multiplexer 32 to switch from the b input to the a input indicating the insertion of prior updates to an otherwise live video signal.

Figure 3:
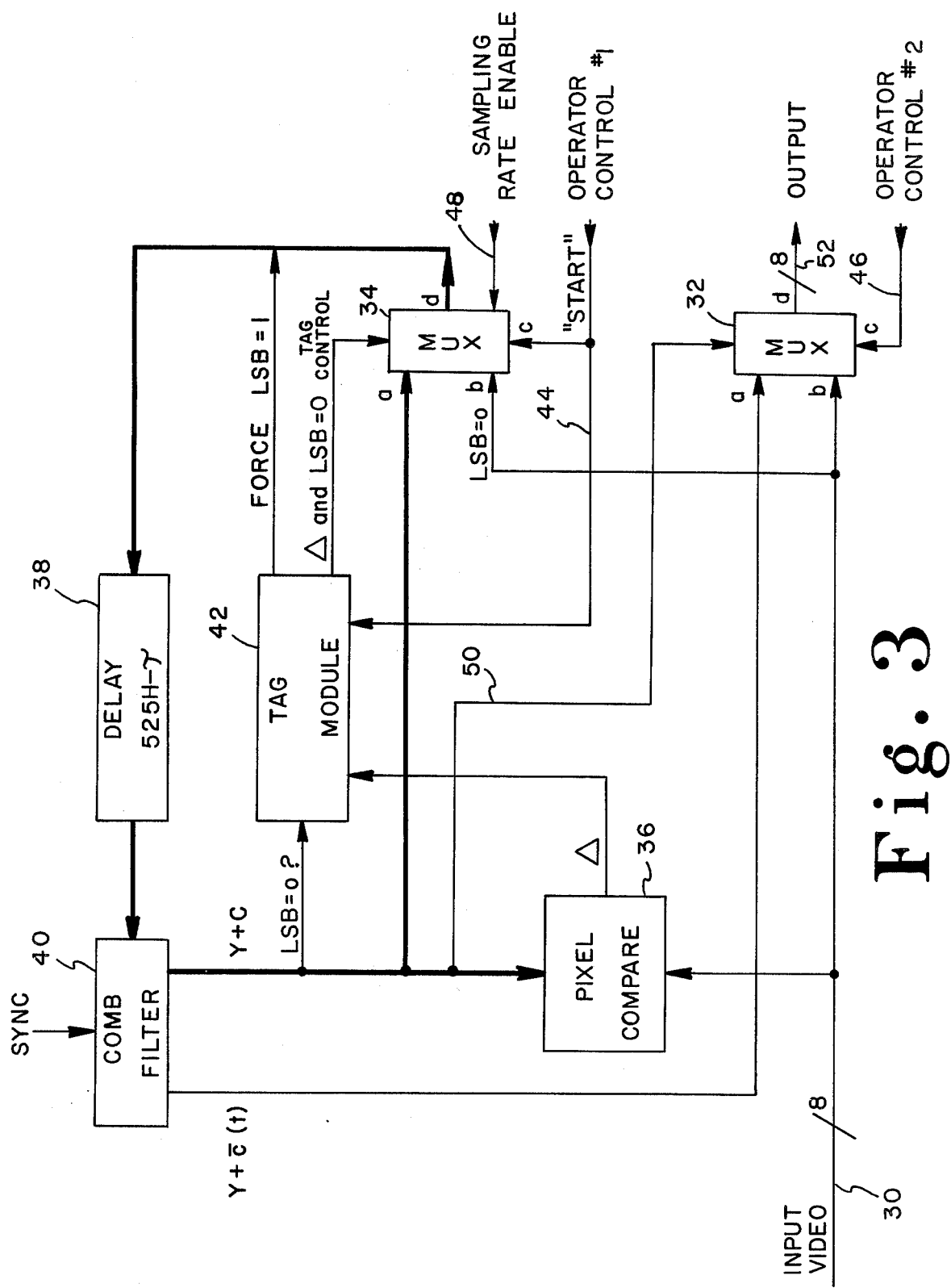
FIG. 3 is a block diagram of a preferred embodiment of a system for displaying and recording paths of motion in color television.

As was the case with the functional diagram of FIG. 2, the system of FIG. 3 has three states of operation: "reset", "start" and "stop". In the reset state, "start" line 44 is "off" and the "Tag Control" and "Force LSB=1" outputs from tag module 42 are both "off". Because multiplexer 34 selects the input to the recirculating loop, the loop is not recirculating in the "reset" state because input b is selected, and the output signal at system output terminal 52 corresponds to the input video signal at input line 30 because multiplexer 32 is conditioned to select the input signal, except in the sampled output mode of operation; the operation is normally continuous unless "Operator Control #2" is actuated.

In the "start" state, "start" line 44 is turned "on", causing multiplexer 34 to couple a reference frame into the recirculating loop, and also causing the "Tag Control" output from tag module 42 to take over control of multiplexer 34 so that whenever during the time the reference frame is recirculating the least significant bit is equal to zero and $\Delta = 1$, multiplexer 34 switches to input terminal b to accept update information from the incoming video signal. Also, when the system is in the continuous mode, the occurrence of a least significant bit equal to "1" on line 50, which is applied to the upper control input of multiplexer 32, causes multiplexer 32 to select chroma phase-corrected recirculating updates appearing at its upper input terminal a.

The "stop" state of the system is initiated by operation of "Operator Control #2" which applies a control signal to control terminal c of multiplexer 32 which causes it to select the Y+C(t) signal appearing at its upper input terminal a. "Operator Control 190 1" also disables the "Tag Control", thus forcing multiplexer 34 to be held in the recirculating mode. Since in this mode multiplexer 34 is selecting the signal at its upper input terminal a, it will continue to recirculate the original reference frame, plus all of the updates that have been added to it during the time period between actuation of the "start" and "stop" controls.

It is essential to the proper operation of the system that updated information inserted into the recirculating stored frame as a result of detection of motion between the stored frame and the incoming video be identified in such a way as not be "erased" by subsequent stored video/incoming video comparisons; otherwise, the ability to display successive spaced apart positions of the ball (in the golf example) would be lost. In the embodiment of FIG. 3, this is accomplished without the requirement for a large capacity storage device by sacrificing the amount of amplitude resolution provided by the least significant bit of the 8-bit encoded signal and using it instead as coding information for identifying updated picture elements. This is accomplished by arbitrarily forcing the least significant bit of each 8-bit word to be zero as it enters multiplexer 34 so that all picture elements entering multiplexer 34 have only seven bits of amplitude information and one bit of update coding information. Thus, all picture elements in the reference frame as initially stored in the recirculating loop have eight bits of information, the least significant of which is always "0". When comparator 36 determines that a change exists between new picture elements and corresponding elements in the recirculating loop, the incoming picture element is "tagged" by the logic of tag module 42 by forcing the least significant bit that was a "0" to become a "1", and immediately replacing those which were in the stored frame initially. It is to be emphasized, however, that the least significant bit of a word describing a picture element of input video forced to be a "1" will go into the stored frame only if the corresponding element of stored video does not already have a "1" as the least significant bit. That is, once a given position in the reference frame, which is mostly background, acquires a "1" in the least significant bit position, it can never be changed again in the cycle between "start" and "stop". Stated another way, initially, upon actuation of the "start" control frame store 38 seizes a frame of video and automatically the least significant bit of the 8-bit word representing individual picture elements are "0"s, which identifies them as being open to change. As the ball (in the present example) or any object in the otherwise substantially static field of view starts to change position and thereby produce picture elements in motion, these picture elements in motion arbitrarily also have "0"s in their least significant bits. As they are inserted into the frame store by the described action of the system to replace those which were initially in corresponding positions in the reference frame, which is primarily background information, the least significant bit is forced to be a "1", and once a code word acquires a "1" in its least significant bit it is never changed again in that cycle of operation of the system.

In the description thus far of the systems of FIGS. 2 and 3, little has been said about how update information is added to the reference frame without losing chrominance information in the face of the fact that in the NTSC system the phase of the color subcarrier is reversed from frame to frame. It is essential, therefore, that the phase of the color subcarrier of the new material inserted into the video stored in the reference frame be the same as that of the stored video signal or otherwise the chroma in the update information will be lost. While in theory the system of FIG. 3 could be made to have the capability of applying update information to the reference frame on every frame of the incoming video by inverting the chrominance component of the update information before it is put into frame store 38, this approach would unnecessarily complicate the system and, moreover, a more pleasing and graphic display is obtained if the comparisons between incoming video and stored video are made less frequently. For example, if frame No. 1 of a television field is stored as the reference frame and no updating is done until frame No. 3 occurs, the color subcarrier of frame 3 will have the same phase as in frame No. 1 and the update information from frame No. 3 can therefore be added without concern for possible chroma phase differences between the stored and update information. Thus, in this example, comparisons between stored and incoming video would be made on the third, fifth, seventh, ninth, etc. frames of the incoming video and any detected motion would cause update information to be inserted in the reference frame at the positions determined by the successive positions of the moving object. In situations where the motion of the object whose track is to be recorded and displayed is relatively slow it is usually preferable to insert update information less frequently than every other frame of incoming video. For example, the relatively slow velocity of a putted golf ball can be very effectively displayed by inserting update information in only one frame out of four, or even a greater number of frames removed from the reference frame, so as to provide a definite spacing between successive displayed positions of the moving object. So as to be able to accommodate to a variety of velocities of motion of the moving object, the system of FIG. 3 is provided with a "Sampling Rate Enable" control on line 48 which, in effect, is a logic level that provides an override control of multiplexer 34 to preset the motion update rate, at the election of the operator, at either every second, fourth, sixth, or eighth, (or any other even number) frame of the incoming video. From what has been said earlier, whichever sampling rate is selected, the update information will have the correct chroma phase and will be inserted as a new picture element or elements in the frame store previously occupied by corresponding reference picture elements. In the case of a golf ball being putted on a green, such successive updates will, in effect, replace grass in the static scene with a white ball.

Although the system of FIG. 3 has been described in terms of storing a reference frame of video information, in a system that has been successfully operated delay device 38 is designed to produce a frozen field interlaced with itself. It has long been known that stop action is generally unacceptable if a true frozen frame of two fully interlaced fields is displayed, the reason being that the temporal juxtaposition of two fields separated in time, and thus in position, particularly when the motion is relatively fast, causes what is known as "interfield flutter". This disturbing effect to the viewer is overcome by interlacing a field with itself. This technique is employed to advantage in the present system and is implemented by substituting for delay device 38 the delay apparatus illustrated in FIG. 4. It includes a first delay device 54 having a delay of 262H, the output of which is applied to the input of a second delay device 56 having a delay of 1H. The output terminals of delay devices 54 and 56 are connected to respective inputs of a multiplexer 58 which alternately selects the output from delay devices 54 and 56 under control of the vertical sync of the television system. Thus, the signal from multiplexer 34 (FIG. 3) is alternately delayed by either 262H, or 263H, with the change of delay occurring every field. This means that every second field the sum of the delays in the recirculating loop will be 262H+263H, or 525H, which is the equivalent of the delay provided by delay device 38 in the system of FIG. 3. It will be evident that when "START" line 44 (FIG. 3) is turned "on", a reference field is coupled into the recirculating loop; by virtue of the just-described action of the two delay devices 54 and 56 the captured field is for all practical purposes interlaced with itself, thereby eliminating interfield flutter in fast-moving imagery. The system effectively ignores the separate 262H and 263H delays by allowing multiplexer 34 to respond on every 4th field, or every 8th field, or every 12th field, such that detected differences between the stored self-interlaced field and subsequently arriving incoming fields of the same sense will be substituted in the stored video only at those times. Thus, instead of making comparisons every second, fourth, sixth, etc., frame as described above, since the delay apparatus of FIG. 4 effectively produces a delay of two frames every four fields, preferably the earliest update would be made on the fourth field following seizure of the stored self-interlaced field, and depending upon the desired frequency of update, comparisons could be made every fourth, eighth, twelfth, etc., field, with provision made always to compare incoming fields of the same sense as the one stored in the recirculating loop. In similar manner, one may update every even numbered field (which would be equivalent to an integral number of frames) provided provision is made for chroma phase correction of the stored video when the even number of fields is not integrally divisible by four.

Figure 4:
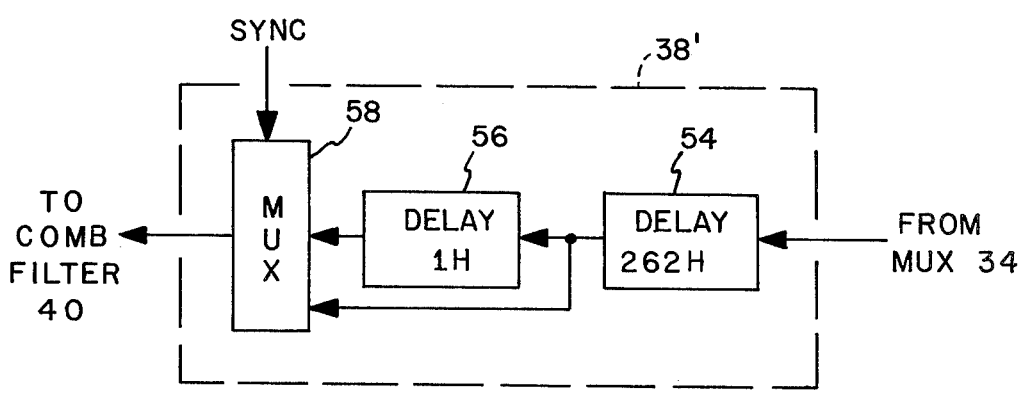
FIG. 4 is a block diagram of an alternate implementation of a part of the system of FIG. 3.

Summarizing, the use of the delay apparatus of FIG. 4 in the system of FIG. 3 effectively freezes a field interlaced with itself so as to eliminate interfield flutter, and at the same time provides a delay equivalent to 525H for purposes of making comparisons between the stored video information and selected subsequently arriving frames. As far as the comparator is concerned, the stored self-interlaced field looks like a television frame, but in the ultimate display it exhibits the motion-related advantages of a frozen field interlaced with itself.

Figure 5:
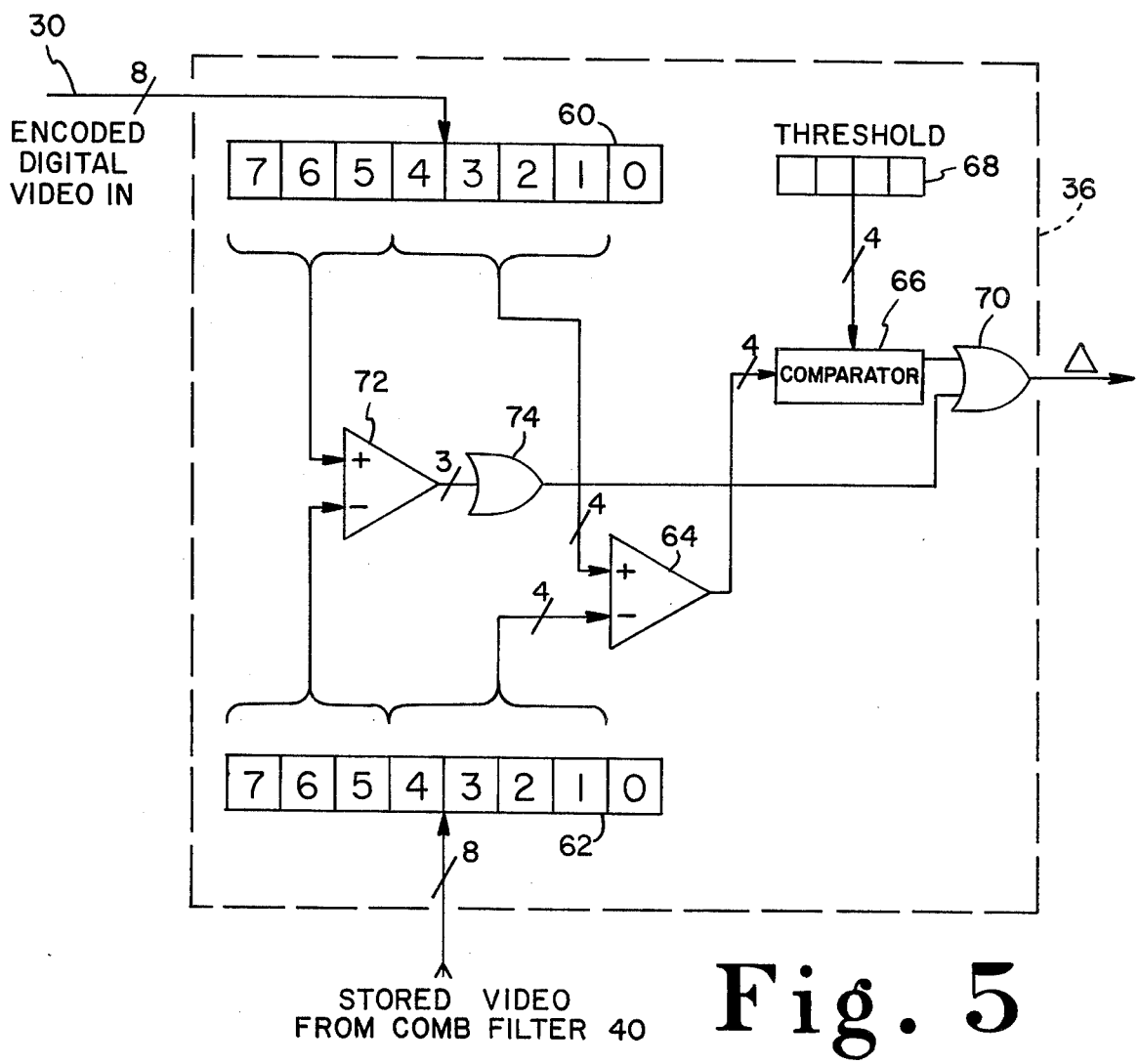
FIG. 5 is a functional block diagram of a circuit useful in the system of FIG. 3 for determining relative motion between past and present video frames.

Although motion between the stored frame and selected frames of the incoming video can be detected in a variety of ways, the digital system shown in the functional diagram of FIG. 5 is particularly suitable. The incoming video signal is received on line 30 as an 8-bits PCM encoded signal and applied to a suitable register, schematically shown at 60, which receives the individual bits of each word, the elements of which are labelled "0" for the least significant bit and "7" for the most significant bit. The stored video from delay device 38 (or 38') and comb filter 40 (also 8-bit PCM-encoded) is applied to a similar "register" 62, the elements of which are also labelled from "0" to "7" to represent the least and most significant bits, respectively. In order to detect motion, the stored video is compared element-by-element (or byte-by-byte) with the incoming video signal. Since, as has been noted earlier, the least significant bit of each word is utilized to "tag" update information, the 7-bit word that repesents the amplitude of the stored signal is compared bit-by-bit with the 7-bit word that represents the amplitude of the present or incoming video signal. Thus, the least significant bit is ignored in the comparison, and because it was recognized that wide differences could not be tolerated, two levels of comparison are employed. More specifically, bits 1, 2, 3 and 4 of the words representing the stored video and incoming video are applied to the − and + input terminals, respectively, of a difference amplifier 64, the output from which is a 4-bit word representative of the difference, if any, between the stored video and the incoming signal. The 4-bit word from the difference amplifier is applied to a comparator 66 which compares it to a 4-bit threshold number, schematically illustrated at 68, of a predetermined preset value substantially greater than zero. If the output from difference amplifier 64 exceeds the preset threshold, the comparator applies a signal to one input of an OR circuit 70.

To take care of the possibility of there being no difference in bits 1, 2, 3 and 4 of the stored and present video signals, yet a large difference actually existing between the stored and present signal which shows up in the more significant bits, a second comparison is made between bits 5, 6 and 7 of the stored video and the corresponding bits of the incoming video. To this end, the three most significant bits of the stored and present video are applied to the − and + input terminals, respectively, of a second difference amplifier 72, the 3-bit word output from which is applied to a 3-input OR circuit 74. When difference amplifier 72 detects a difference between the three most significant bits of the stored and present video, indicating that there is motion between them, the OR circuit 74 applies a signal to the second input of OR circuit 70. Thus, in either event of the difference between the four least significant bits exceeding a predetermined threshold, or there being a difference between the three most significant bits, a signal is produced at the output of OR circuit 70. Summarizing, when comparison of the stored and incoming video indicates less than a predetermined amount of motion, there is no output from the OR circuit 70. However, when the system detects motion in excess of a predetermined amount, a true logic signal is produced for application to tag module 42 (FIG. 3), which, if the least significant bit of the word representing a corresponding picture element in the stored frame is at the same time a "0", causes a "Tag Control" signal to be generated for controlling multiplexer 34 in the manner described previously.

It will be recognized from the foregoing description that the origin of the video signal, provided it has the characteristics of the conventional NTSC color television signal, does not affect its operation; that is, the incoming video signal may be derived from a color television camera, from a video tape recorder, from a slow-motion reproducer, or from telecine apparatus. Thus, it is convenient to use in a "live" telecasting environment, such as the telecasting of a sports event, and if the operator should have missed telecasting a particular event when it occurred, he can later take the signal from a video tape recorder and display the motion track of a moving object.

It will be evident that although the results are similar to classic stroboscopic still frame photography, the system offers greater flexibility of display and fewer production constraints. Although the system has been described in the context of television sports coverage, and may be as significant to this field as slow-motion and stop action have proven to be, the remarkably beautiful and informative pictures which can be generated by the system may also prove useful in other entertainment and news programming, and in teaching and training applications.

Although the invention has been described as applied to the NTSC system of color television, it is obviously directly applicable to monochrome television, and, indeed, in this environment would have particular utility in closed circuit systems for industrial process control, or in the making of training tapes for teaching the steps of an assembly process, for example. Also, with relatively minor modification in the circuitry for handling the color component, the invention is equally applicable in other known color television systems, such as PAL and SECAM. Since it is not uncommon in frame stores for the PAL and SECAM systems to use "component coding" in place of the "composite coding" employed with the NTSC system, there is no carrier signal to contend with and thus no requirement for chroma phase inversion.

While the invention has been described with reference to a specific preferred embodiment, along with suggested modifications to adapt it to other applications, it is intended that such modifications, and others that will now be apparent to ones skilled in the art, be encompassed by the following claims.

We claim:

1. Apparatus for deriving from arriving television signals, video signals for displaying simultaneously a succession of selected separated images of an object moving over a selectable time period in an otherwise substantially static scene, said apparatus comprising:

means including storage means for delaying a video signal for a period substantially equal to the period of one television frame, said storage means adapted to accept substitute information concerning individual picture elements of a television signal stored therein, switching means normally operative to couple arriving video signals to an apparatus output terminal and connectable, in response to initiation by an operator of the start of a selectable time period, to said storage means for coupling one frame of arriving video signals to said storage means, said switching means and said storage means when connected constituting a recirculating loop for storing said one television frame, means for comparing said stored television frame with selected television frames subsequently arriving during said selectable time period and for controlling said switching means in response to detection of differences between corresponding picture elements of the stored and subsequently arriving frames to substitute in the stored frame those picture elements that caused the detected difference, means for identifying those picture elements that have been previously substituted in the stored frame during said selectable time period and in response thereto controlling said switching means to preclude another substitution of the same picture elements in the stored frame, and operator-controlled means for terminating said selectable time period and for controlling said switching means to couple to said apparatus output terminal at least the video signal representing the picture elements substituted in said stored frame during said selectable time period.

2. Apparatus according to claim 1, wherein
   said switching means includes means for switching to said apparatus output terminal throughout said selectable time period a video signal representing arriving video signals and said substituted picture elements.

3. Apparatus according to claim 1, wherein
   said switching means includes means for switching said stored frame including picture elements substituted therein to said apparatus output terminal throughout said selectable time period.

4. Apparatus according to claim 1, wherein
   said arriving television signals are digitally encoded, and wherein
   said storage means is a digital frame store.

5. Apparatus according to claim 4, further including means for controlling said switching means to successively compare said stored television frame with subsequently arriving television frames displaced from said stored frame by an integral number of television frames.

6. Apparatus according to claim 5, wherein said means for controlling said switching means causes comparison of said stored television frame with subsequently arriving television frames displaced from said stored frame by a selected even number of television frames.

7. Apparatus according to claim 5, wherein said arriving television signals are color video signals having luminance and chrominance components, wherein said means for controlling said switching means causes comparison of said stored television frame with subsequently arriving television frames displaced from said stored frame by an even number of television frames, and further including means for modifying the chrominance component of the stored video signal so as to be in proper phase relationship to be added without cancellation to the chrominance component of the arriving color video signal.

8. Apparatus according to claim 4, wherein each picture element of the digitally encoded arriving television signal is represented by at least one multi-bit word, and wherein said identifying means utilizes a selected bit of each word to identify previously substituted picture elements in the stored frame.

9. Apparatus according to claim 8, wherein said identifying means is operative to force the selected bit of each word representing the initially stored television signal to be one of two binary values, and to force the selected bit of those words representing substituted picture elements in the stored frame to be the other of two binary values.

10. Apparatus according to claim 9, wherein said multi-bit word is an 8-bit word, the least significant bit of each word is utilized to identify previously substituted picture elements in the stored frame, and said identifying means is operative to force the least significant bit of each word representing the picture elements of the initially stored signal to be a "0", and to force the least significant bit of those words representing substituted picture elements in the stored frame to be a "1".

11. Apparatus according to claim 10, wherein said identifying means includes logic means connected to receive inputs from said storage means and said comparator means and operative in response to the simultaneous occurrence of logic levels from said comparator means and the least significant bit of a picture element-representing word in the stored frame to control said switching means so as to substitute the current picture element of arriving video signals for that picture element contained in the stored video and whose least significant bit is a "0", and to force the least significant bit of said substituted picture element of arriving video to be a "1" upon entry to the recirculating storage loop.

12. Apparatus according to claim 1, wherein said arriving television signals are NTSC color video signals, and wherein said storage means has a delay period of substantially 525H, where H is the period of one horizontal television line.

13. Apparatus according to claim 1, wherein said arriving television signals are digitally encoded NTSC color video signals, and said storage means comprises first and second delay devices for delaying a video signal for a period substantially equal to the period of 262H and 1H, respectively, where H is the period of one television line, said first and second delay devices being connected in series in said recirculating loop, and means connected to the outputs of said first and second delay devices and operative in response to the vertical sync of said television signals to alternately delay a television field stored in said recirculating loop by a period of 262H and 263H.

14. Apparatus according to claim 13, further including means for controlling said switching means to successively compare said stored video signal with subsequently arriving television fields displaced from the stored field by an integral number of television frames.

15. Apparatus according to claim 14, wherein said switching means includes means for switching to said apparatus output terminal throughout said selectable time period a video signal representing arriving video signals and said substituted picture elements.

16. Apparatus according to claim 15, wherein said switching means includes further means for alternatively switching said stored field including substituted picture elements to said apparatus output terminal throughout said selectable time period.

17. Apparatus according to claim 13, wherein each picture element of the digitally encoded arriving television signal is represented by an 8-bit word, the least significant bit of each word is utilized to identify previously substituted picture elements in the stored video signal, and said identifying means is operative to force the least significant bit of each word representing the picture elements of the initially stored video signal to be a "0", and to force the least significant bit of those words representing substituted picture elements in the stored video to be a "1".

18. Apparatus according to claim 17, wherein said identifying means includes logic means for controlling said switching means so as to substitute the current picture element of arriving video signals for that picture element contained in the stored video and whose least significant bit is a "0", and to force the least significant bit of said substituted picture element of arriving video to be a "1" upon entry to the recirculating storage loop.

19. Apparatus according to claim 1, wherein said arriving television signals are digitally encoded NTSC color video signals, and wherein said storage means comprises means for interlacing a single television field with itself for achieving a delay substantially equal to the period of one television frame.

20. Apparatus according to claim 19, wherein said apparatus further comprises means for controlling said switching means to successively compare said stored video signal with subsequently arriving television fields displaced from the stored field by an integral number of television frames.

21. Method of deriving signals from arriving television video signals for displaying simultaneously a succession of separate images of an object moving over a selectable time period in an otherwise substantially static scene, comprising the steps of:
   (a) storing, at the start of said selectable time period, a reference field of video representing said scene at the start of said selectable time period;
   (b) comparing picture elements of selected television fields subsequently arriving during said selectable time period with corresponding picture elements of said stored reference field;
   (c) identifying and substituting in said stored reference field those picture elements of said subsequently arriving fields shown by step (b) to be different from those in said stored reference field, unless the corresponding picture element of an earlier one of said subsequently arriving fields has already been substituted in said stored reference field; and
   (d) deriving a video signal representing at least those picture elements identified and substituted during said selectable time period.

22. Method for generating a video signal for displaying simultaneously a succession of images of an object moving over a selected time period in an otherwise substantially static scene, comprising the steps of:
   (a) storing a reference field of video representing said scene at the start of said selected time period;
   (b) comparing picture elements of selected time-separated television fields subsequently arriving during said selected time period with corresponding picture elements of said reference field;
   (c) substituting in said stored reference field those picture elements of said subsequently arriving fields shown by step (b) to be different from those in said reference field and tagging said substituted picture elements to preclude another substitution of the same picture elements in the reference field; and
   (d) at the termination of said selected time period, providing a video signal representing said scene with the substitution therein of those picture elements tagged during the selected time period.

23. Method of deriving, from arriving television signals, video signals for displaying simultaneously a succession of selected separate images of an object moving over a selectable time period in an otherwise substantially static scene, comprising the steps of:
   (a) storing an arriving field of video representing said scene at the start of said selectable time period;
   (b) comparing picture elements of the stored field with corresponding picture elements of selected television fields subsequently arriving during the said selectable time period;
   (c) in response to detection of a difference between corresponding picture elements of the stored and subsequently arriving fields, identifying and substituting in said stored field the picture element of the subsequently arriving field, unless the corresponding picture element of an earlier one of the said subsequently arriving fields has already been identified and substituted in said stored field in response to the detection of such a difference; and
   (d) deriving an output video signal representing at least said subsequently identified and substituted picture elements.

24. Apparatus for deriving, from arriving television signals, video signals for displaying simultaneously a selected succession of time-separated images of an object moving over a selectable time period in an otherwise substantially static scene, said apparatus comprising:
   means including storage means adapted to store one television field and to accept substitute information concerning individual picture elements of a television field stored therein;
   switching means normally operative to couple arriving video signals to an apparatus output terminal and operative, in response to initiation of the start of a selectable time period, to couple to said storage means an arriving video signal representing said scene at the start of said selectable time period;
   means for comparing picture elements of the stored television field with corresponding picture elements of selected television fields subsequently arriving during the said selectable time period and for controlling said switching means in response to detection of a difference between corresponding picture elements of the stored and subsequently arriving fields to identify and substitute in said stored field the picture element of the subsequently arriving field, unless the corresponding picture element of an earlier one of the subsequently arriving fields has already been identified and substituted in the stored field in response to the detection of such a difference; and
   means for controlling said switching means to derive at said apparatus output terminal an output video signal representing at least the said subsequently identified and substituted picture elements.

25. Apparatus according to claim 24, wherein said means for controlling said switching means is operative to derive at the termination of the said selectable time period an output video signal representing said scene including picture elements substituted therein during the said selectable time period.

26. Apparatus according to claim 24, wherein said means for controlling said switching means is operative to derive at said apparatus terminal throughout said selectable time period an output video signal representing arriving video signals and picture elements identified and substituted in said stored field subsequent to storage of the television field representing said static scene.

* * * * *

UNITED STATES PATENT AND TRADEMARK OFFICE
CERTIFICATE OF CORRECTION

PATENT NO. : 4,179,704
DATED : December 18, 1979
INVENTOR(S) : J. Kenneth Moore, Arthur Kaiser, Henry W. Mahler It is certified that error appears in the above-identified patent and that said Letters Patent are hereby corrected as shown below:

Col.6, line 19, change "Y+C(t) to -- Y+$\overline{C}$(t) --.

Col.6, line 49, insert a comma (,) before "produced".

Col.7, line 45, change "Y+C(t)" to -- Y+$\overline{C}$(t) --.

Col.7, line 46, change "190 1" to -- #1 --.

Signed and Sealed this

Twenty-fifth Day of March 1980

[SEAL]

Attest:

SIDNEY A. DIAMOND

Attesting Officer     Commissioner of Patents and Trademarks